(12) United States Patent
Boot

(10) Patent No.: US 9,174,635 B2
(45) Date of Patent: Nov. 3, 2015

(54) METHOD FOR ACTUATING THE CRUISE CONTROL FUNCTION IN A VEHICLE EQUIPPED WITH HYBRID DRIVING, ESPECIALLY AN INDUSTRIAL OR COMMERCIAL VEHICLE

(75) Inventor: Marco Aimo Boot, Caselle Torinese (IT)

(73) Assignee: Iveco S.P.A., Turin (IT)

( * ) Notice: Subject to any disclaimer, the term of this patent is extended or adjusted under 35 U.S.C. 154(b) by 173 days.

(21) Appl. No.: 13/990,568

(22) PCT Filed: Dec. 6, 2011

(86) PCT No.: PCT/EP2011/071879
§ 371 (c)(1),
(2), (4) Date: May 30, 2013

(87) PCT Pub. No.: WO2012/076507
PCT Pub. Date: Jun. 14, 2012

(65) Prior Publication Data
US 2013/0245912 A1 Sep. 19, 2013

(30) Foreign Application Priority Data

Dec. 6, 2010 (EP) .................................... 10425373

(51) Int. Cl.
*B60T 8/32* (2006.01)
*G05D 1/00* (2006.01)
(Continued)

(52) U.S. Cl.
CPC ............... *B60W 20/108* (2013.01); *B60K 6/48* (2013.01); *B60W 10/06* (2013.01); *B60W 10/08* (2013.01); *B60W 20/00* (2013.01); *B60W 30/143* (2013.01); *B60W 30/182* (2013.01); *B60K 2310/00* (2013.01); *B60K 2310/30* (2013.01);
(Continued)

(58) Field of Classification Search
USPC ................... 701/22, 93; 180/179, 65.225
See application file for complete search history.

(56) References Cited

U.S. PATENT DOCUMENTS 6,116,363 A     9/2000  Frank
2003/0236599 A1* 12/2003  Saito et al. ................ 701/22
(Continued)

FOREIGN PATENT DOCUMENTS

DE      19937381            3/2001
WO      WO2009136819       11/2009
WO      WO 2009136819 A1 * 11/2009

OTHER PUBLICATIONS

Robert Bosch GmbH, "Automotive Handbook"; "Adaptive Cruise Control (ACC)"; Jan. 1, 2001; vol. 5; pp. 714-715.*
(Continued)

*Primary Examiner* — Tuan C. To
*Assistant Examiner* — Isaac Smith
(74) *Attorney, Agent, or Firm* — Stetina Brunda Garred & Brucker

(57) ABSTRACT

The present invention describes a method for actuating the cruise control function in a vehicle equipped with hybrid driving, comprising at least a primary driving and an electric driving. The method comprises the steps of: —cyclic check of the possibility of activation of the cruise control function; if positive—activation of the electric driving of the type "electric cruise-control" (ElCC), and deactivation of the primary driving, if a cyclic check of the conditions of activation of the electric driving is positive; otherwise—activation of the primary driving of the type "engine cruise-cruise control" (EnCC), and deactivation of the electric driving.

5 Claims, 4 Drawing Sheets

(51) Int. Cl.

| | | |
|---|---|---|
| *G06F 7/00* | (2006.01) | |
| *G06F 17/00* | (2006.01) | |
| *B60W 20/00* | (2006.01) | |
| *B60K 6/48* | (2007.10) | |
| *B60W 10/06* | (2006.01) | |
| *B60W 10/08* | (2006.01) | |
| *B60W 30/14* | (2006.01) | |
| *B60W 30/182* | (2012.01) | |

(52) U.S. Cl.
CPC ...... *B60W2510/244* (2013.01); *B60W 2520/10* (2013.01); *B60W 2530/10* (2013.01); *B60W 2540/10* (2013.01); *B60W 2540/12* (2013.01); *B60W 2550/142* (2013.01); *B60W 2550/402* (2013.01); *B60W 2710/105* (2013.01); *Y02T 10/6221* (2013.01); *Y02T 10/6291* (2013.01); *Y10S 903/902* (2013.01); *Y10T 477/26* (2015.01)

(56) References Cited

U.S. PATENT DOCUMENTS

| | | | |
|---|---|---|---|
| 2004/0068359 A1* | 4/2004 | Neiss et al. | 701/96 |
| 2006/0161330 A1* | 7/2006 | Lupo | 701/93 |
| 2007/0112475 A1* | 5/2007 | Koebler et al. | 701/1 |
| 2007/0114084 A1 | 5/2007 | Huelser et al. | |
| 2011/0034296 A1* | 2/2011 | Stervik | 477/3 |

OTHER PUBLICATIONS

Automotive Handbook; "Adaptive Cruise Control (ACC)"; Jan. 1, 2001; vol. 5; pp. 714-715.

* cited by examiner

METHOD FOR ACTUATING THE CRUISE CONTROL FUNCTION IN A VEHICLE EQUIPPED WITH HYBRID DRIVING, ESPECIALLY AN INDUSTRIAL OR COMMERCIAL VEHICLE

APPLICATION FIELD OF THE INVENTION

The present invention refers to a method for actuating the cruise control function in a vehicle equipped with hybrid driving, especially an industrial or commercial vehicle.

DESCRIPTION OF THE PRIOR ART

The cruise control function, as it is known, maintains a steady vehicle's speed, by means of a control usually activated by hand, which works by controlling the functioning of the internal combustion engine.

If said function is adopted on a vehicle equipped with a hybrid driving system, which usually includes at least a internal combustion engine and an electric motor-generator, the problem of controlling the functioning of the hybrid driving system arises, during the activation steps of the function itself, in order to optimize the reduction of fuel consumption and of vehicle noise and the increase of driving comfort which characterize such driving system.

SUMMARY OF THE INVENTION

Therefore the aim of the present invention is to provide a method for actuating the cruise control function in a moving vehicle, especially an industrial or commercial vehicle, suitable for overcoming all the drawbacks mentioned above.

The object of the present invention, according to claim 1, is a method for actuating the cruise control function in a vehicle equipped with hybrid driving, especially an industrial or commercial vehicle, said hybrid driving comprising at least a primary driving and an electric driving, the method comprising, when said cruise control function is required, the steps of:

cyclic check of the possibility of activation of said cruise control function; if positive activation of said electric driving of the type "electric cruise-control", and deactivation of said primary driving, if a cyclic check of the conditions of activation of the electric driving is positive; otherwise activation of said primary driving of the type "engine cruise-cruise control", and deactivation of said electric driving.

The object of the present invention is also a vehicle, especially an industrial or commercial vehicle, comprising control means configured in order to realize the method.

In particular the object of the present invention is a method for actuating the cruise control function in a vehicle equipped with hybrid driving, especially an industrial or commercial vehicle, as described more fully in the claims, which are an integral part of this description.

BRIEF DESCRIPTION OF THE FIGURES

Further purposes and advantages of the present invention will become clear from the following detailed description of a preferred embodiment (and its alternative embodiments) and the drawings that are attached hereto, which are merely illustrative and non-limitative, in which.

DETAILED DESCRIPTION OF THE INVENTION

Figure 1:
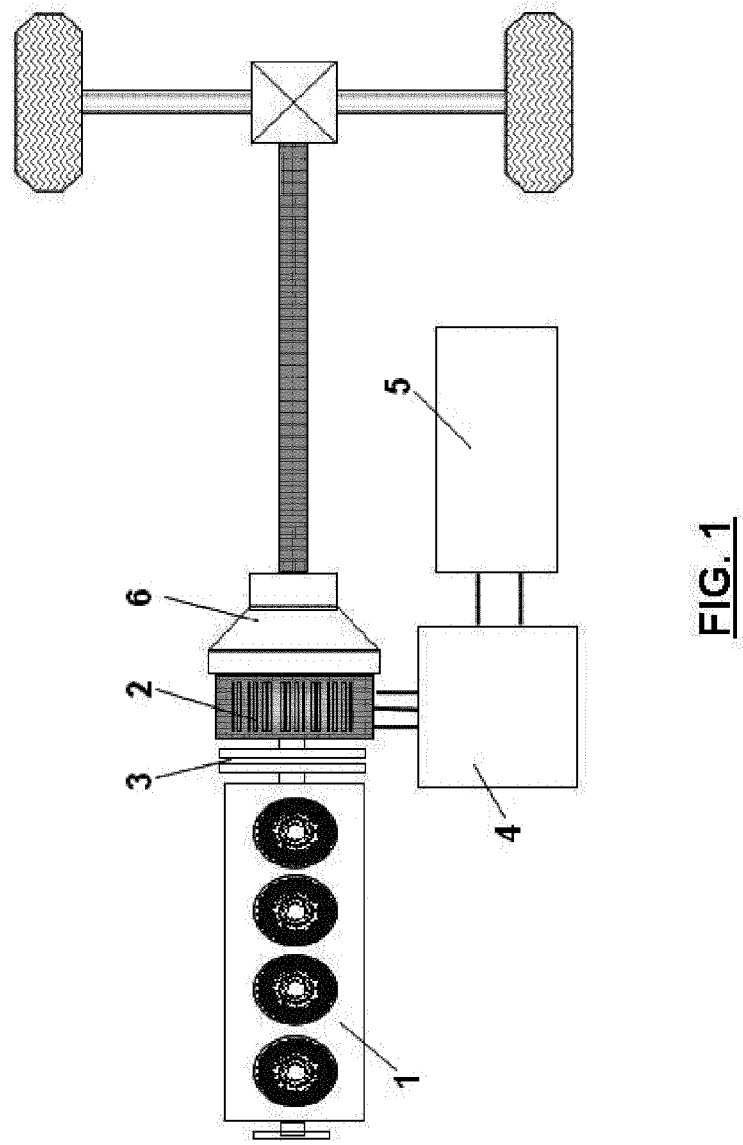
FIG. 1 shows a general scheme of a hybrid driving system of a vehicle which applies the method according to the present invention.

A non-limitative example of a hybrid driving system of an industrial or commercial vehicle of the type known in the art, wherein it is possible to apply the present invention, is shown in FIG. 1.

The system is characterized by a parallel hybrid driving system, comprising a primary driving system formed by a internal combustion engine 1, an electric motor-generator 2, equipped with a DC/AC inverter 4 and with a high-voltage electric driving battery 5, a single clutch unit 3 placed between the engine and the motor, and a transmission system 6 comprising an automated manual transmission. The latter is substantially a mechanical gearbox wherein electric actuators are present and are controlled by a specially provided control unit which manages shifting and clutch control requests, according to the driving management strategies of the internal combustion engine and electric motor.

Figure 2:
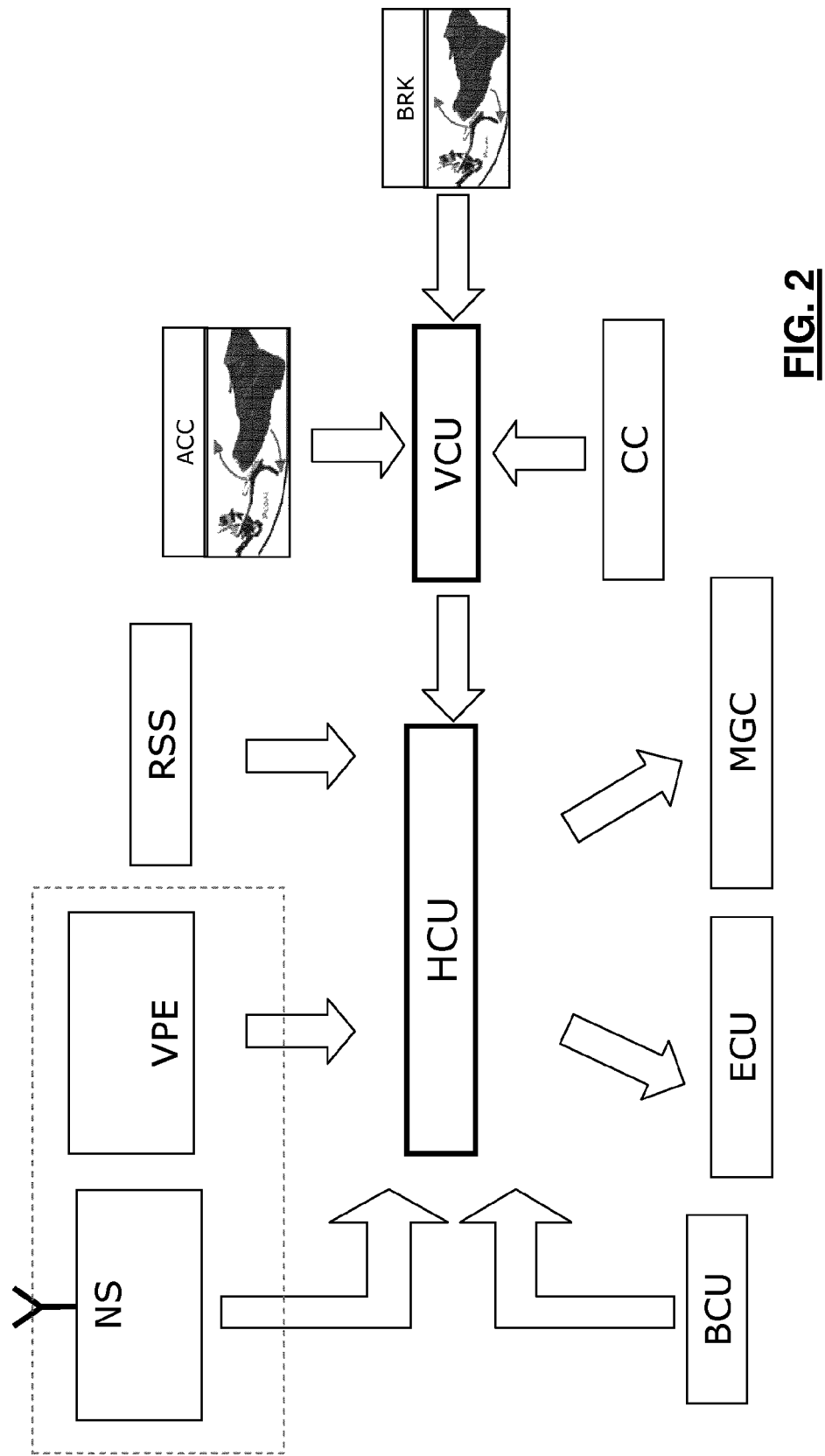
FIG. 2 shows a block diagram of an electronic system for controlling the functioning of the different elements of FIG. 1.

An electronic system for controlling the functioning of the different elements of FIG. 1 is present. For example the system may include, as shown in FIG. 2, a vehicular electronic control unit VCU which receives at least the signals from the sensors of the accelerator pedal ACC and of the brake pedal BRK, and a signal from a switch, that can be manually activated, which indicates the activation of the cruise control function CC. An electronic control unit of the hybrid driving system HCU controls the functioning of the internal combustion engine by means of a control unit ECU, and the functioning of the electric motor-generator by means of a control unit MGC. The unit HCU also receives data relating at least to the battery state of charge from the battery control unit BCU, and to the indication of the road slope from a road slope sensor RSS. The unit HCU preferably has at its disposal indications and data deriving from a vehicular navigation system NS, preferably of the three-dimensional type, comprising both the instant and the predictive indication of the road slope, and the indication of the vehicle weight from an evaluation system VPE of the vehicle weight when moving.

The method for actuating the cruise control function that is object of the invention may be activated by means of an electronic control system as the one shown in FIG. 2.

According to such method, in the instant when the cruise control function CC is activated, the vehicle maintains the set speed preferably by using the electric motor, better if it is of the motor-generator type, if all the predetermined enabling conditions exist, which are described below in an example, and secondarily by using the traditional internal combustion engine, when the electric motor alone is no longer able to ensure that required target speed is maintained.

The method may be implemented on any vehicle equipped with a hybrid driving system, wherein at least two propulsion systems are present, and wherein at least an electric driving and a primary driving are present.

Figure 3:
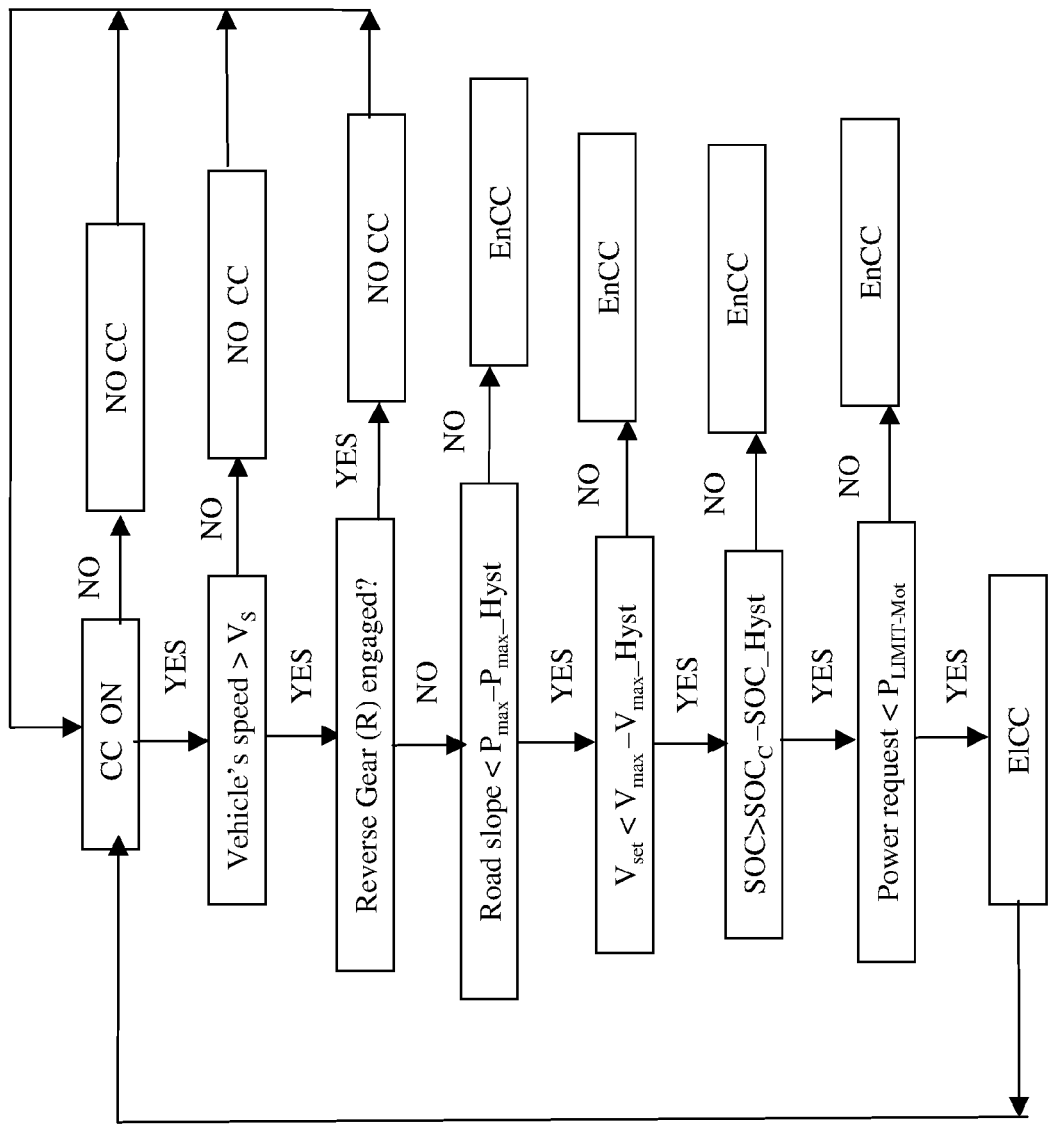
FIGS. 3 and 4 show flowcharts of the operations that characterize the method of the present invention.

With reference to FIG. 3, an embodiment of the method is described.

When the cruise control function CC is manually activated, for example by pressing the corresponding button (CC ON), a sequence of checks verify if the conditions are satisfied: if all these conditions are satisfied, the "Electric Cruise Control" function ElCC is activated and the driving in cruise control mode is ensured by the electric engine alone, otherwise even if only one of these conditions is not satisfied, the "Engine Cruise Control" function EnCC is activated, and the driving in cruise control mode is ensured in the traditional way, for example by means of the primary driving alone, with internal combustion engine.

The conditions to be checked are the following:

If vehicle's speed>VS, where VS is a threshold value of vehicle's speed, below which the cruise control function cannot be activated (block NO CC), for example VS=25 km/h.

If the vehicle is moving forward, namely if the transmission is in Reverse (R): if the car is reversing, the cruise control function (block NO CC) cannot be activated.

If the road slope is lower than a threshold value which is preferably variable within certain limits, namely if Road Slope<(Pmax±Pmax_Hyst), where Pmax is the nominal upper limit of the road slope (e.g. Pmax=8%), and Pmax_Hyst is a tolerated percentage variation around the value Pmax (e.g. Pmax_Hyst=±1%): if the slope exceeds said limit, the "Engine Cruise Control" function EnCC is activated. Such tolerated percentage variation of the slope threshold is necessary to avoid a repeated switching between ON and OFF of the activation control of the cruise control function for minimal variations of road slope, or also to avoid continual and repeated switching between "Electric Cruise Control" ElCC and "Engine Cruise Control" EnCC. The Road Slope value is to be intended as an absolute value, namely the road slope may be either positive (uphill) or negative (downhill).

If the target speed set for the activation of the cruise control function Vset is lower than a speed threshold value Vmax which is preferably variable within certain limits, namely if Vset<(Vmax±Vmax_Hyst), where Vmax is the maximum speed (e.g. Vmax=65 km/h, which does not corresponds to the maximum vehicle's speed, but is correlated to the maximum power limit of the motor-generator) above which it is not possible to activate the "Electric Cruise Control" function ElCC, but only the "Engine Cruise Control" function EnCC, and Vmax_Hyst is a tolerated percentage variation around the value Vmax (e.g. Vmax_Hyst=±5 km/h), with equivalent considerations with respect to Pmax_Hyst.

If the state of charge of the driving battery SOC exceeds a state of charge threshold value which is preferably variable within certain limits, namely if SOC>(SOC$_s$±SOC_Hyst), where SOC is the percentage expressing the instant charging level of the driving battery, SOC$_s$ is the state of charge threshold below which it is not possible to activate the "Electric Cruise Control" function ElCC, but only the "Engine Cruise Control" function EnCC (e.g. SOC$_s$=±4%), and SOC_Hyst is a tolerated percentage variation around the value SOC$_s$ (e.g. SOC_Hyst±4%), with equivalent considerations with respect to Pmax_Hyst and Vmax_Hyst.

If the instant power request to the driving system is lower than a power limit value $P_{LIMIT-Mot}$ that can be provided by the electric motor (constructive parameter of the motor), namely if Power Request<$P_{LIMIT-Mot}$, otherwise the "Engine Cruise Control" function EnCC is activated.

It is to be noted that if indications and data deriving from the vehicular navigation system NS of the three-dimensional type are available, and include both the instant and the predictive indication of the road slope, and the indication of the vehicle weight from an evaluation system VPE of the vehicle weight when moving, it is possible to obtain a further functionality. The speed value Vmax, the battery state of charge value SOC$_s$ and its tolerated percentage variation SOC_Hyst, the threshold speed value VS may be dynamically changed as a function of the road conditions and of the route defined by the navigation system or by the user itself, being it possible to suppose for how much time it will be possible to keep the cruise control function working. In this case, the road slope sensor RSS may not be used, since such piece of information is provided by the navigation system that is equipped with a three-dimensional cartography.

All the previous conditions are continuously and iteratively checked, until the cruise control function CC is deactivated.

When the "Electric Cruise Control" function ElCC is enabled, the internal combustion engine of the primary driving may be stopped or run at idle, according to the configuration of the driving system.

When the "Engine Cruise Control" function EnCC is enabled, the electric motor may be controlled in order to work as a generator, and is able to provide negative torque for decelerating the vehicle when the speed exceeds the upper threshold value Vset. Such negative torque may be required for example by the control unit ECU when the "Electric Cruise Control" function is enabled. This situation is typical of a vehicle travelling on a road with negative slope. Thus it is possible to obtain a recovery of the kinetic energy into electric energy that is stored in the high-tension battery of the hybrid system. Otherwise such contribution would be dissipated in the form of heat on the service brakes, and the vehicle braking should be exclusively actuated by hand by the driver, when the vehicle's speed exceeds the threshold Vset with engine torque equal to zero.

Figure 4:
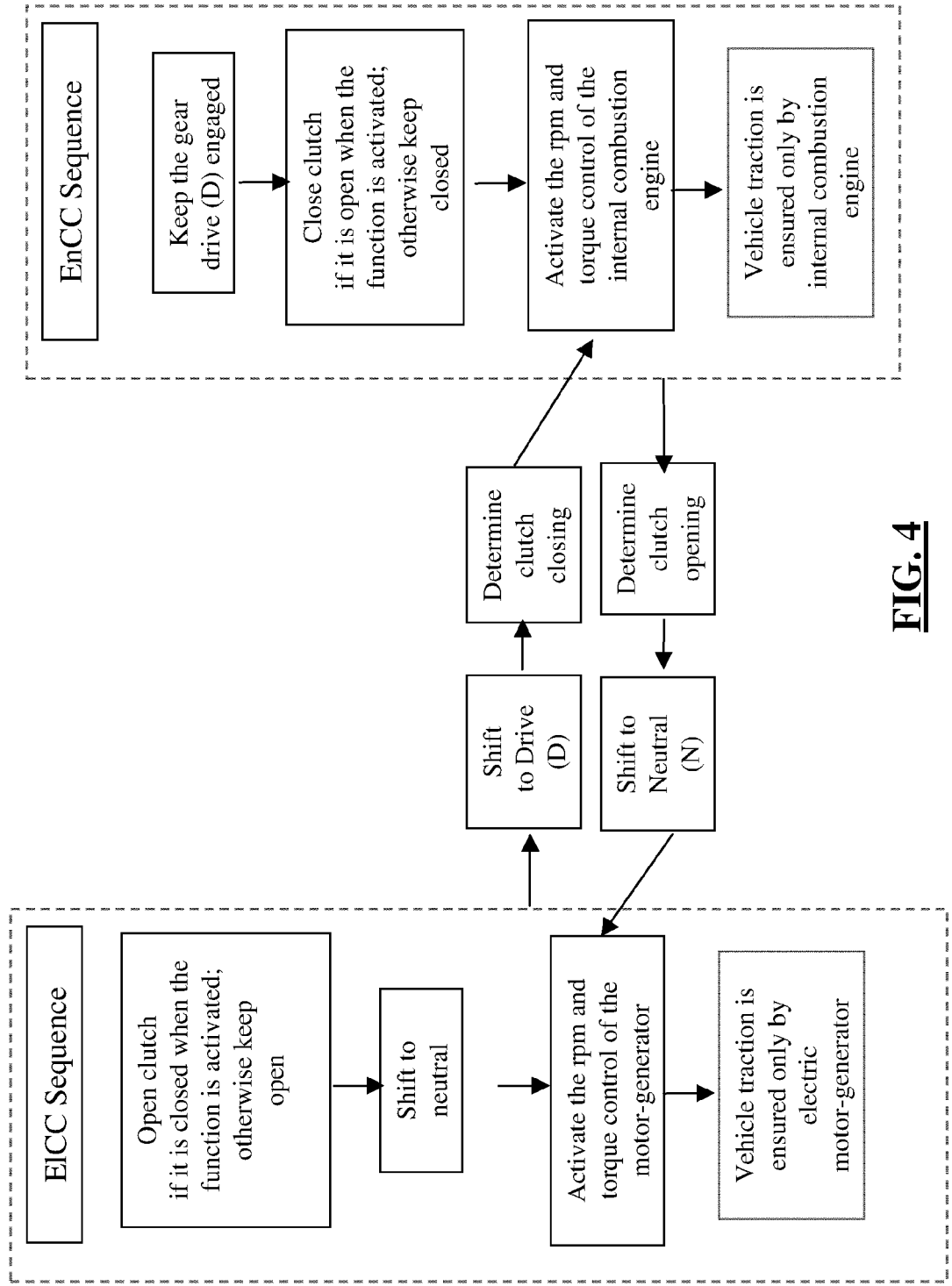

With reference to FIG. 4, the sequence of the activation steps of the "Electric Cruise Control" function ElCC and of the "Engine Cruise Control" functions EnCC are described below, especially relating to the hybrid driving example described above with reference to FIG. 1.

When the "Electric Cruise Control" function ElCC is activated, the control unit HCU determines the clutch 3 opening, if the clutch is closed when the function is activated, otherwise it keeps it open; then it shifts the gear 6 to neutral (position "N"); after than it activates the rpm control and the torque delivery of the motor-generator 2. In this situation the vehicle driving is ensured by the electric motor-generator alone.

When the "Electric Cruise Control" function ElCC is activated, the control unit HCU keeps the gear in drive (position "D"); then it determines the closing of the clutch, if the clutch is open when the function is activated, otherwise it keeps it closed; after than it activates the rpm control and the torque delivery of the internal combustion engine 1. In this situation the vehicle driving is ensured by the primary driving (internal combustion engine) alone.

During the transition from the "Electric Cruise Control" function ElCC to the "Engine Cruise Control" function EnCC, the control unit HCU shifts to drive (position "D"), then determines the closing of the clutch in order to activate the primary driving (internal combustion engine), and finally it activated the rpm control and the torque delivery of the internal combustion engine.

During the transition from the "Engine Cruise Control" function EnCC to the "Electric Cruise Control" function ElCC, the control unit HCU determines the opening of the clutch, then shifts to neutral (position "N") in order to activate the electric motor by means of the rpm and torque control.

The transitions between the two modes are determined by the continuous verification of the conditions described above. The method of the present invention may advantageously be realized by means of computer programs loaded on the various electronic control units of the vehicle, which comprise program code means performing one or more steps of said method, when said programs are run on a computer. Therefore the scope of the present patent is meant to cover also said computer programs and the computer-readable means that comprise a recorded message, such computer-readable means comprising the program code means for performing one or more steps of such method, when said programs are run on a computer.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details.

The invention claimed is:

1. Method for actuating the cruise control function in a vehicle equipped with hybrid driving, especially an industrial or commercial vehicle, said hybrid driving comprising at least a primary driving and an electric driving, the method comprising the steps of:
cyclic check of the possibility of activation of said cruise control function, wherein said cyclic check of the possibility of activation of the cruise control function comprises:
check if the vehicle's speed exceeds a speed threshold value (VS);
check if the vehicle is moving forward; if positive
activation of said electric driving of the type "electric cruise-control" (ElCC), and deactivation of said primary driving, if a cyclic check of the conditions of activation of the electric driving is positive, wherein said cyclic check of the activation conditions of the electric driving comprises:
if a road slope is lower than a slope threshold value (Pmax);
if a target speed (Vset) set for the activation of the cruise control function is lower than a speed threshold value (Vmax);
if the state of charge (SOC) of the driving battery of said electric driving is higher than a state of charge threshold value ($SOC_s$);
if an instant power required to said electric driving is lower than a power limit value $P_{LIMIT\text{-}Mot}$ deliverable by said electric driving
wherein the state of charge threshold value (SOCs) and one or more values of said slope threshold values (Pmax), speed threshold value (Vmax), deliverable power limit value ($P_{LIMIT\text{-}Mot}$), are variable within respective tolerated percentage variations around the respective values; otherwise
activation of said primary driving of the type "engine cruise-cruise control" (EnCC), and deactivation of said electric driving;
wherein when said cruise control function is actuated, said vehicle is configured to transition between "electric cruise-control" (ElCC) and "engine cruise-cruise control" (EnCC) without combining "electric cruise-control" (ElCC) and "engine cruise-cruise control" (EnCC).

2. Method for actuating the cruise control function according to claim 1, wherein the tolerated percentage variation SOC_Hyst of the battery state of charge (SOCs) is variable as a function of indications and data deriving from a vehicular navigation system (NS) of the three-dimensional type, comprising both an instant and a predictive road slope indication, and an indication of the weight of the vehicle.

3. Method for actuating the cruise control function according to claim 1, wherein when said primary driving of the type "engine cruise-control" (EnCC) is enabled, said electric driving is controlled so that it provides a negative torque in order to decelerate the vehicle when the speed exceeds said target speed value (Vset).

4. An industrial or commercial vehicle, comprising a hybrid driving system comprising at least a primary driving (1), an electric driving (2), at least a clutch (3) between said primary and electric driving, and an automated manual transmission (6), and comprising control means configured to realize the method according to claim 1.

5. Method for actuating the cruise control function according to claim 1, wherein at least one of said speed threshold values (Vmax), of battery state of charge (SOCs), of the threshold speed (VS), is variable as a function of indications and data deriving from a vehicular navigation system (NS) of the three-dimensional type, comprising both an instant and a predictive road slope indication, and an indication of the weight of the vehicle.

* * * * *